United States Patent Office 3,412,087
Patented Nov. 19, 1968

3,412,087
3β - TRI(HYDROCARBON SUBSTITUTED)SILYL ETHERS OF THE PREGNANE AND ANDROSTANE SERIES
John A. Edwards, Los Altos, Calif., assignor to Syntex Corporation, Panama, Panama, a corporation of Panama
No Drawing. Filed Nov. 14, 1966, Ser. No. 593,722
22 Claims. (Cl. 260—239.55)

This invention relates to novel cyclopentanophenanthrene derivatives and to a method for the preparation thereof. More particularly, the present invention relates to novel 3β-tri(hydrocarbon substituted)silyl ethers of the pregnane and adrostane series.

The novel compounds of the present invention are represented by the following general formulas:

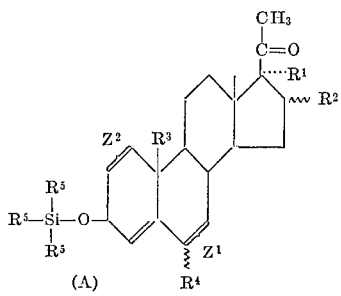

(A)

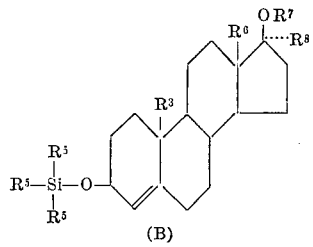

(B)

wherein $Z^1$ is a carbon-carbon single bond, a carbon-carbon double bond or a fused methylene group of the type

in which X is hydrogen, chloro or fluoro;

$Z^2$ is a carbon-carbon single bond or a fused methylene group of the type

in which X is hydrogen, chloro or fluoro;

$R^1$ is hydrogen, hydroxy or a hydrocarbon carboxylic acyloxy group;

$R^2$ is hydrogen, α-methyl, β-methyl or methylene;

$R^1$ and $R^2$ together is the group

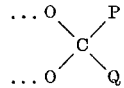

in which P is hydrogen, lower alkyl or aryl and Q is lower alkyl or aryl;

$R^3$ is hydrogen or methyl;

$R^4$ is hydrogen, methyl, trifluoromethyl, fluoro or chloro, the configuration of $R^4$ being alpha when $Z^1$ is a carbon-carbon single bond and the configuration of $R^4$ being beta when $Z^1$ is the group

in which X is hydrogen, chloro or fluoro;

Each of $R^5$ independently is alkyl, aryl, alkaryl, aralkyl or cycloalkyl;

$R^6$ is hydrogen, methyl or ethyl;

$R^7$ is hydrogen, a hydrocarbon carboxylic acyl group, tetrahydropyran-2′-yl or tetrahydrofuran-2′-yl; and $R^8$ is hydrogen, methyl, ethyl, vinyl, ethynyl, propynyl or chloroethynyl.

In the definition of the $R^5$ substituent, by the term "alkyl" is meant a straight or branched chain group containing from one to eight carbon atoms, inclusive, such as methyl, ethyl, isopropyl, t-butyl, isopentyl, hexyl, octyl and the like. By the term "aryl" is meant a group containing one or more aromatic rings such as phenyl, naphthyl and the like. By the term "alkaryl" is meant a phenyl group containing an alkyl substituent in the o, m or p positions such as o-tolyl, m-tolyl, p-tolyl and the like. By the term "aralkyl" is meant an alkyl group containing one or more phenyl substituents such as phenethyl, trityl and the like. By the term "cycloalkyl" is meant a cyclic group containing five or six carbon atoms, i.e. cyclopentyl or cyclohexyl.

In the definition of P and Q in the group

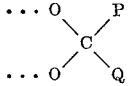

by the term "lower alkyl" is meant a straight or branched chain group containing from one or four carbon atoms, inclusive, and includes such terms as methyl, ethyl, i-propyl and the like; by the term "aryl" is meant an aromatic group, i.e. phenyl, optionally containing a lower alkyl group in the o, m or p positions such as o-tolyl, m-tolyl, p-tolyl and the like.

By the terms "hydrocarbon carboxylic acyl" and "hydrocarbon carboxylic acyloxy" are meant the groups

and

respectively, wherein R is a straight, branched, cyclic or cyclic aliphatic chain structure of less than 12 carbon atoms. This structure may be saturated, unsaturated or aromatic and optionally substituted by functional groups such as hydroxy, alkoxy containing up to five carbon atoms, acyloxy containing up to 12 carbon atoms, nitro, amino, halogeno and the like. Typical esters thus include acetate, propionate, enanthate, benzoate, trimethylacetate, t - butylacetate, phenoxyacetate, cyclopentylpropionate, aminoacetate, β-chloropropionate, adamantoate, dichloroacetate, and the like.

The novel 3β-tri(hydrocarbon substituted)silyl ethers of the present invention exhibit valuable hormonal properties characteristic of orally active hormonal agents. They possess hormonal activities associated with anti-fertility agents and are useful in fertility control and the management of various menstrual conditions such as menopause syndrome. In addition, they possess hormonal properties associated with anti-androgenic and anti-estrogenic agents.

The novel 3β-tri(hydrocarbon substituted)silyl ethers of the present invention are administered via conventional routes for fertility control agents, i.e. orally or parenterally, preferably intramuscularly, in pharmaceutically acceptable compositions or solutions and at dosage rates of from 0.5γ to 5 mg./kg./day. However, dosage rates below or above this range can also be used; the most favorable dosage rate and administration route being conditioned upon the purpose for which it is administered and the response thereto.

The novel 3β-tri(hydrocarbon substituted)silyl ethers of the present invention are prepared as indicated in the following sequences:

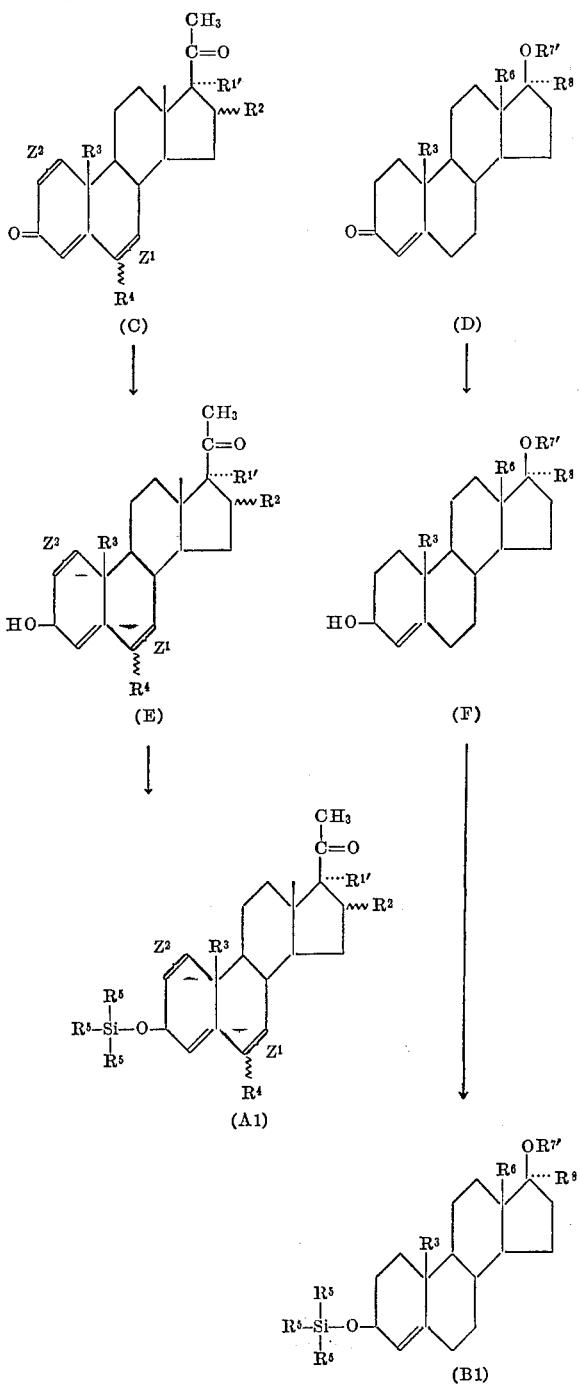

wherein $R^{1'}$ is hydrogen or a hydrocarbon carboxylic acyloxy group;

$R^{1'}$ and $R^2$ together is the group

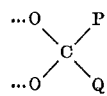

in which P is hydrogen, lower alkyl, aryl and Q is lower alkyl or aryl;

$R^{7'}$ is a hydrocarbon carboxylic acyl group, tetrahydropyran-2'-yl or tetrahydrofuran-2'-yl; and All other substituents are as defined hereinabove.

In the above sequences, a 3-keto starting material of the pregnane and androstane series, of Formulas C and D respectively, all of which have been previously described in patents and/or in the literature with the exception of those compounds of Formula C, wherein each of $Z^1$ and $Z^2$ or $Z^1$ and $Z^2$ together, is a fused methylene group of the type

in which X is chloro or fluoro, the latter 3-keto starting materials of Formula C being prepared in copending application, Ser. No. 486,226, filed Sept. 9, 1965, now U.S. Patent No. 3,338,928, is selectively reduced to a corresponding 3β-hydroxy compound of the pregnane and androstane series, of Formulas E and F, respectively, by treatment with lithium tri(t-butoxy)aluminum hydride in an inert hydrocarbon solvent such as benzene, dioxane, tetrahydrofuran and the like, and at temperatures of from about 25° C. to the reflux temperature of the solvent but preferably at room temperature, a period from about one to about 24 hours. In a preferred embodiment of this invention, a 3-keto starting material of Formulas C and D, respectively, is reduced by treatment with lithium tri(t-butoxy)aluminum hydride in tetrahydrofuran at room temperature for a period of 12 hours.

For the preparation of the 3β-tri(hydrocarbon substituted)silyl ethers of the present invention, a free 3β-hydroxy steroid of the pregnane or androstane series, of Formulas E and F, respectively, is reacted under substantially anhydrous conditions, with a tri(hydrocarbon substituted)halosilane in the presence of a base, i.e. a hydrogen halide acceptor, either alone or together, with an inert organic cosolvent at a temperature of from about 25° C. to about 100° C. for a period of about one to about 24 hours.

As an alternative method for the preparation of the 3β-tri(hydrocarbon substituted)silyl ethers of the present invention, the free 3β-hydroxy steroid of the pregnane or androstane series, of Formulas E and F, respectively, is reacted under substantially anhydrous conditions, with a tri(hydrocarbon substituted) fluorosilane in the presence of an alkali metal alkoxide such as sodium or potassium ethoxide, either alone or together, with an inert organic cosolvent at a temperature of from about 25° C. to about 100° C. for a period of about one hour or about 24 hours.

The tri(hydrocarbon substituted)halosilanes which can be used in the first-mentioned method for the preparation of the novel silyl ethers of the present invention, can be either a tri(hydrocarbon substituted)fluorosilane, a tri(hydrocarbon substituted)chlorosilane, a tri(hydrocarbon substituted)bromosilane or a tri(hydrocarbon substituted) iodosilane. Preferably in this process, the tri(hydrocarbon substituted)halosilane is a tri(hydrocarbon substituted) chlorosilane. In general, they are commercially available and lead to higher yields than either the fluoro, bromo or iodosilanes for this process. In addition, the tri(hydrocarbon substituted)fluorosilane can be used in the alternative process as detailed above.

Among the tri(hydrocarbon substituted)halosilanes which can be used in preparing the novel 3β-tri(hydrocarbon substituted)silyl ethers of the pregnane and androstane series of the present invention are symmetrically substituted trialkyl (including cycloalkyl)halosilanes, such as trimethylfluorosilane, tri(n-propyl)fluorosilane tri-(i-butyl)fluorosilane, tri(n-pentyl)fluorosilane, tri(n-octyl) fluorosilane, trimethylchlorosilane, triethylchlorosilane, tri (n-propyl)chlorosilane, tri(i-propyl)chlorosilane, tri(i-pentyl)chlorosilane, tri(n-hexyl)chlorosilane, tri(cyclohexyl)chlorosilane, tri(n-heptyl)chlorosilane, trimethylbromosilane, triethylbromosilane, tri(n-propyl)bromosilane, tri(i - butyl)bromosilane, tri(n - pentyl)bromosilane, tri(cyclohexyl)bromosilane, trimethyliodosilane, tri(n - propyl)iodosilane, tri(i - propyl)iodosilane, tri (i-pentyl)iodosilane, and the like; unsymmetrically substituted trialkylhalosilanes wherein two alkyl groups are the same such as di(n-propyl)methylfluorosilane, di(i - propyl)methylfluorosilane, dimethylethylchlorosilane, dimethyl-n-propylchlorosilane, dimethyl-i-propylchlorosilane, dimethyl-t-butylchlorosilane, dimethyl-n-octylchlorosilane, diethylmethylchlorosilane, diethyl-n-propylchlorosilane, diethyl-i-propylchlorosilane, di(n-propyl) methylchlorosilane, di(i-propyl)methylchlorosilane, di(n-propyl)ethylchlorosilane, di(i-propyl)ethylchlorosilane, dimethylethylbromosilane, diethylmethylbromosilane; and the like; unsymmetrically substituted trialkylhalosilanes wherein all three alkyl groups are different such as ethylmethyl-n-propylchlorosilane and the like; dialkylmonoaryl (including alkaryl and aralkyl)halosilanes such as dimethylphenylfluorosilane, methyl-n-propylphenethylfluorosilane, methyl-i-propylphenethylfluorosilane, methyl-i-butylphenethylfluorosilane, dimethylphenylchlorosilane, dimethyl-m-tolylchlorosilane, dimethyl-p-tolylchlorosilane, dimethylphenethylchlorosilane, diethylphenylchlorosilane, methyl-n-propylphenylchlorosilane, and the like; monoalkyldiarylhalosilanes such as methyldiphenylchlorosilane, ethyldiphenylchlorosilane, n-propyldiphenylchlorosilane, and the like; and triaryl (including alkaryl and aralkyl)halosilanes such as triphenylfluorosilane, tris(p-tolyl)fluorosilane, diphenylphenethylfluorosilane, diphenyltritylfluorosilane, triphenylchlorosilane, tris(m-tolyl) chlorosilane, tris(p-tolyl)chlorosilane, diphenyl-m-tolylchlorosilane, diphenyl-p-tolylchlorosilane, bis(p-tolyl) phenylchlorosilane, triphenylbromosilane, tris(p - tolyl) bromosilane, tris(1-naphthyl)bromosilane, triphenyliodosilane, and the like.

Among the inert organic solvents which can be used in preparing the novel 3β-tri(hydrocarbon substituted)silyl ethers of the present invention are diethyl ether, benzene, toluene, n-hexane, dioxane, tetrahydrofuran, dimethylformamide, dimethylsulfoxide, and the like, but preferably benzene.

The solvent employed in the method of preparing the novel 3β-tri(hydrocarbon substituted)silyl ethers of the present invention must be substantitlly anhydrous, i.e. it should have as low a moisture content as can be practically achieved. One relatively simple method of arriving at a low moisture content of the solvent benzene involves the azeotropic removal of the water. A relatively simple method of arriving at a low moisture content of the solvent dimethylsulfoxide involves drying the solvent over a molecular sieve, such as Linde Type 4A or LOX (which are commercially available beads or pellets of alkali metal aluminosilicates) for from about three days to about seven days at a temperature from about 20° C. to about 30° C. Other conventional drying methods for other solvents can be employed to render those solvents essentially anhydrous as is known in the art.

Among the bases which can be used in preparing the novel 3β-tri(hydrocarbon substituted)silyl ethers of the present invention are common hydrogen halide acceptors such as ammonia, quinoline, pyridine, trimethylamine, N,N-dimethylaniline, flake magnesium, and the like. In general, any hydrogen halide acceptor, e.g. ammonia, quinoline, pyridine, trimethylamine, N,N-dimethylaniline, flake magnesium, and the like, can be used as the base in preparing the novel 3β-tri(hydrocarbon substituted)silyl ethers of the present invention, but preferably pyridine or N,N-dimethylaniline is used.

In a preferred embodiment of the present invention, the novel 3β-tri(hydrocarbon substituted)silyl ethers of the present invention are prepared by allowing the 3β-hydroxy steroid of Formulas E and F, to react with a tri(hydrocarbon substituted)chlorosilane in the presence of pyridine or N,N-dimethylaniline as the hydrogen chloride acceptor with anhydrous benzene at the reflux temperature of the mixture for a period of about 12 hours.

The novel 3β-tri(hydrocarbon substituted)silyl ethers of Formulas A and B, wherein $R^1$ is hydroxy and $R^7$ is hydrogen, respectively, are prepared from a corresponding 3β-tri(hydrocarbon substituted)silyl ether-17α-acyloxy steroid of the pregnane series of Formula A1 or a 3β-tri(hydrocarbon substituted)silyl ether - 17β - acyloxy steroid of the androstane series of Formula B1 by hydrolysis under basic conditions by treatment with an alcoholic solution of an alkali metal hydroxide such as a methanolic solution of potassium hydroxide, an ethanolic solution of sodium hydroxide and the like, at a temperature of from about 25° C. to the reflux temperature of the alcohol, and preferably the latter, for a period of about two to about four hours, preferably the acyloxy group is acetoxy.

The following examples provide additional illustration of the present invention but are not intended to limit the scope thereof.

Example 1

A solution of 2 g. of 1α,2α-methylene-6-chloro-17α-acetoxypregna-4,6-diene-3,20-dione in 20 ml. of anhydrous tetrahydrofuran is added to a solution of 1 g. of lithium tri(t-butoxy)aluminum hydride in 20 ml. of anhydrous tetrahydrofuran. The reaction mixture is allowed to stand at 25° C. for a period of 12 hours and is then poured into ice water and extracted several times with ethyl acetate. These extracts are washed with water, dried over anhydrous sodium sulfate, and evaporated to dryness to yield 1α,2α-methylene-3β-hydroxy-6-chloro-17α-acetoxypregna-4,6-dien-20-one.

To a stirred and refluxing solution of 1 g. of the latter material in 8 ml. of diethyleneglycol dimethyl ether is added in a dropwise fashion over a two-hour period, a solution of 30 equivalents of sodium chlorodifluoroacetate in 30 ml. of diethyleneglycol dimethyl ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 1α,2α-methylene-3β-hydroxy-6β-chloro-6α,7α-difluoromethylene-17α-acetoxypregn-4-en-20-one.

Example 2

A solution of 2 g. of 6-chloro-17α-acetoxypregna-4,6-diene-3,20-dione in 20 ml. of anhydrous tetrahydrofuran is added to a solution of 1 g. of lithium tri(t-butoxy) aluminum hydride in 20 ml. of anhydrous tetrahydrofuran. The reaction mixture is allowed to stand at 25° C. for a period of 12 hours and is then poured into ice water and extracted several times with ethyl acetate. These extracts are washed with water, dried over anhydrous sodium sulfate and evaporated to dryness to yield 3β-hydroxy-6-chloro-17α-acetoxypregna-4,6-dien-20-one.

Utilizing the above procedure, the following 3β-hydroxy compounds, namely

3β-hydroxypregn-4-en-20-one;
3β-hydroxy-6-chloro-17α-acetoxy-19-norpregna-4,6-dien-20-one;

3β-hydroxy-6-methyl-17α-acetoxypregna-4,6-dien-20-one;
3β-hydroxy-6-methyl-17α-acetoxy-19-norpregna-4,6-dien-20-one;
3β-hydroxy-6-chloro-16α-methyl-17α-acetoxypregna-4,6-dien-20-one;
3β-hydroxy-6-chloro-16-methylene-17α-acetoxypregna-4,6-dien-20-one;
3β-hydroxy-6-methyl-16α-methyl-17α-acetoxypregna-4,6-dien-20-one;
3β-hydroxy-6-methyl-16-methylene-17α-acetoxypregna-4,6-dien-20-one;
3β-hydroxy-6α,7α-difluoromethylene-17α-acetoxypregn-4-en-20-one;
3β-hydroxy-6α,7α-difluoromethylene-16α,methyl-17α-acetoxypregn-4-en-20-one;
3β-hydroxy-6β-chloro-6α,7α-difluoromethylene-17α-acetoxypregn-4-en-20-one;
3β-hydroxy-6β-fluoro-6α,7α-difluoromethylene-17α-acetoxypregn-4-en-20-one;
1α,2α-methylene-3β-hydroxy-6-chloro-17-acetoxypregna-4,6-dien-20-one;
1α,2α-difluoromethylene-3β-hydroxy-6-chloro-17α-acetoxypregna-4,6-dien-20-one;
1α,2α-methylene-3β-hydroxy-6β-chloro-6α,7α-difluoromethylene-17α-acetoxypregn-4-en-20-one;
3β-hydroxy-6α-chloro-17α-acetoxypregn-4-en-20-one;
3β-hydroxy-6α-methyl-17α-acetoxypregn-4-en-20-one;
3β-hydroxy-17α-acetoxypregn-4-en-20-one;
3d-hydroxy-17α-acetoxy-19-norpregn-4-en-20-one;
3β-hydroxy-16α-methyl-17α-acetoxypregn-4-en-20-one;
3β-hydroxy-16-methylene-17α-acetoxypregn-4-en-20-one;
3β-hydroxy-16α,17α-isopropylidenedioxypregn-4-en-20-one;
3β-hydroxy-16α,17α-(α-methylbenzylidenedioxy)pregn-4-en-20-one;
3β-hydroxy-17α-ethynyl-17β-acetoxy-18-methyl-19-norandrost-4-ene;
3β-hydroxy-17α-ethynyl-17β-acetoxy-19-norandrost-4-ene;
3β-hydroxy-6α-trifluoromethyl-17α-acetoxypregn-4-en-20-one;
3β-hydroxy-6-chloro-17α-capryloxypregna-4,6-dien-20-one;
3β-hydroxy-17α-chloroethynyl-17β-acetoxy-19-norandrost-4-ene;
3β-hydroxy-17α-ethynyl-17β-acetoxyandrost-4-ene;
3β-hydroxy-17α-ethynyl-17β-(tetrahydropyran-2'-yloxy)-19-norandrost-4-ene;
3β-hydroxy-17α-ethynyl-17β-acetoxy-18-methylandrost-4-ene;
3β-hydroxy-17β(tetrahydrofuran-2'-yloxy)androst-4-ene; and
3β-hydroxy-6α-trifluoromethylpregn-4-en-20-one;

are obtained by using as the starting material the corresponding 3-keto compound.

Example 3

To a mixture of 1 g. of 3β-hydroxy-6-chloro-17α-acetoxypregna-4,6-dien-20-one and 1 ml. of pyridine in 20 ml. of anhydrous benzene is added 2 g. of trimethylsilyl chloride. The reaction mixture is heated at reflux for a period of 12 hours. The reaction mixture is cooled to room temperature, filtered and the crude material is passed through a column containing neutral alumina eluting with benzene:ether to yield 3β-trimethylsilyloxy-6-chloro-17α-acetoxypregna-4,6-dien-20-one which is recrystallized from acetone:hexane.

By repeating the above reaction with each of the 3β-hydroxy steroids prepared in Example 2, there are obtained the corresponding 3β-trimethylsilyloxy final products, namely 3β-trimethylsilyloxypregn-4-en-20-one;
3β-trimethylsilyloxy-6-chloro-17α-acetoxy-19-norpregna-4,6-dien-20-one;
3β-trimethylsilyloxy-6-methyl-17α-acetoxypregna-4,6-dien-20-one;
3β-trimethylsilyloxy-6-methyl-17α-acetoxy-19-norpregna-4,6-dien-20-one;
3β-trimethylsilyloxy-6-chloro-16α-methyl-17α-acetoxypregna-4,6-dien-20-one;
3β-trimethylsilyloxy-6-chloro-16-methylene-17α-acetoxypregna-4,6-dien-20-one;
3β-trimethylsilyloxy-6-methyl-16α-methyl-17α-acetoxypregna-4,6-dien-20-one;
3β-trimethylsilyloxy-6-methyl-16-methylene-17α-acetoxypregna-4,6-dien-20-one;
3β-trimethylsilyloxy-6α,7α-difluoromethylene-17α-acetoxypregn-4-en-20-one;
3β-trimethylsilyloxy-6α,7α-difluoromethylene-16α-methyl-17α-acetoxypregn-4-en-20-one;
3β-trimethylsilyloxy-6β-chloro-6α,7α-difluoromethylene-17α-acetoxypregn-4-en-20-one;
3β-trimethylsilyloxy-6β-fluoro-6α,7α-difluoromethylene-17α-acetoxypregn-4-en-20-one;
1α,2α-methylene-3β-trimethylsilyloxy-6-chloro-17-acetoxypregna-4,6-dien-20-one;
1α,2α-difluoromethylene-3β-trimethylsilyloxy-6-chloro-17α-acetoxypregna-4,6-dien-20-one;
1α,2α-methylene-3β-trimethylsilyloxy-6β-chloro-6α,7α-difluoromethylene-17α-acetoxypregna-4-en-20-one;
3β-trimethylsilyloxy-6α-methyl-17α-aetoxypregna-4-en-20-one;
3β-trimethylsilyloxy-6α-methyl-17α-acetoxypregn-4-en-20-one;
3β-trimethylsilyloxy-17α-acetoxypregn-4-en-20-one;
3β-trimethylsilyloxy-17α-acetoxy-19-norpregn-4-en-20-one;
3β-trimethylsilyloxy-16α-methyl-17α-acetoxypregn-4-en-20-one;
3β-trimethylsilyloxy-16-methylene-17α-acetoxypregn-4-en-20-one;
3β-trimethylsilyloxy-16α,17α-isopropylidenedioxypregn-4-en-20-one;
3β-trimethylsilyloxy-16α,17α-(α-methylbenzylidenedioxy)-pregn-4-en-20-one;
3β-trimethylsilyloxy-17α-ethynyl-17β-acetoxy-18-methyl-19-norandrost-4-ene;
3β-trimethylsilyloxy-17α-ethynyl-17β-acetoxy-19-norandrost-4-ene;
3β-trimethylsilyloxy-6α-trifluoromethyl-17α-acetoxypregn-4-en-20-one;
3β-trimethylsilyloxy-6-chloro-17α-capryloxypregna-4,6-dien-20-one;
3β-trimethylsilyloxy-17α-chloroethynyl-17β-acetoxy-19-norandrost-4-ene;
3β-trimethylsilyloxy-17α-ethynyl-17β-acetoxyandrost-4-ene;
3β-trimethylsilyloxy-17α-ethynyl-17β-(tetrahydropyran-2'-yloxy)-19-norandrost-4-ene;
3β-trimethylsilyloxy-17α-ethynyl-17β-acetoxy-18-methylandrost-4-ene;
3β-trimethylsilyloxy-17β-(tetrahydrofuran-2'-yloxy)-androst-4-ene; and
3β-trimethylsilyloxy-6α-trifluoromethylpregn-4-en-20-one.

Example 4

By utilizing the method as described in Example 3, the following 3β-hydroxy steroids are reacted with the indicated tri(hydrocarbon substituted)halosilanes to yield the corresponding 3β-tri(hydrocarbon substituted) final products, namely

| 3β-Hydroxy Steroid | Tri(hydrocarbon substituted) halosilane | Final Product |
|---|---|---|
| 3β-hydroxy-16α,17α-(α-methylbenzylidenedioxy)pregn-4-en-20-one. | Ethylmethylpropylchlorosilane. | 3β-(ethylmethylpropylsilyloxy)-16α,17α-(α-methylbenzylidenedioxy)-pregn-4-en-20-one. |
| 3β-hydroxy-6α,7α-difluoromethylene-17α-acetoxypregn-4-en-20-one. | Diethylphenylchlorosilane. | 3β-(diethylphenylsilyloxy)-6α,7α-difluoromethylene-17α-acetoxypregn-4-en-20-one. |
| 3β-hydroxy-16α-methyl-17α-acetoxypregna-4,6-dien-20-one. | Tricyclohexylbromosilane. | 3β-(tricyclohexylsilyloxy)-16α-methyl-17α-acetoxypregna-4,6-dien-20-one. |
| 3β-hydroxy-17α-ethynyl-17β-(tetrahydropyran-2'-yloxy)-19-norandrost-4-ene. | Di-n-propylmethyliodosilane. | 3β-(di-n-propylmethylsilyloxy)-17α-ethynyl-17β-(tetrahydropyran-2'-yloxy)-19-norandrost-4-ene. |
| 3β-hydroxy-17α-ethynyl-17β-acetoxy-19-norandrost-4-ene. | Triphenylfluorosilane. | 3β-(triphenylsilyloxy)-17α-ethynyl-17β-acetoxy-19-norandrost-4-ene. |
| 1α,2α-methylene-3β-hydroxy-6-chloro-17α-acetoxypregna-4,6-dien-20-one. | Phenyldi-p-tolylchlorosilane. | 1α,2α-methylene-3β-(phenyldi-p-tolylsilyloxy)-6-chloro-17α-acetoxypregna-4,6-dien-20-one. |
| 3β-hydroxy-17α-ethynyl-17β-acetoxy-18-methyl-androst-4-ene. | Diphenylmethylbromosilane. | 3β-(diphenylmethylsilyloxy)-17α-ethynyl-17β-acetoxy-18-methyl-androst-4-ene. |
| 3β-hydroxy-6-chloro-17α-acetoxypregna-4,6-dien-20-one. | Dimethyl-t-butylchlorosilane. | 3β-(dimethyl-t-butylsilyloxy)-6-chloro-17α-acetoxypregna-4,6-dien-20-one. |

Example 5

To a mixture of 1 g. of 3β-hydroxy-6-chloro-17α-acetoxypregna-4,6-dien-20-one and 1 g. of sodium ethoxide in 20 ml. of anhydrous benzene is added 2 g. of trimethylfluorosilane. The reaction mixture is heated at reflux for a period of 12 hours. The reaction mixture is cooled to room temperature, filtered and the crude reaction mixture is then passed through a column containing neutral alumina, eluting with benzene:ether, to yield 3β-trimethylsilyloxy - 6 - chloro-17α-acetoxypregna-4,6-dien-20-one which is recrystallized from acetone:hexane.

Utilizing the above procedure, the following 3β-hydroxy starting materials are reacted with the indicated fluorosilane to yield the following final products:

| 3β-Hydroxy Starting Material | Tri(hydrocarbon substituted) fluorosilane | Final Product |
|---|---|---|
| 3β-hydroxy-6-chloro-16-methylene-17α-acetoxypregna-4,6-dien-20-one. | Tri-o-tolyl-fluorosilane. | 3β-(tris-o-tolylsilyloxy)-6-chloro-16-methylene-17α-acetoxypregna-4,6-dien-20-one. |
| 3β-hydroxy-6α-methyl-17α-acetoxy-pregn-4-en-20-one. | Di-i-propylmethylfluorosilane. | 3β-(di-i-propylmethylsilyloxy)-6α-methyl-17α-acetoxypregn-4-en-20-one. |
| 3β-hydroxy-6β-chloro-6α,7α-difluoromethylene-17α-acetoxypregn-4-en-20-one. | Tri-i-butyl-fluorosilane. | 3β-(tri-i-butylsilyloxy)-6β-chloro-6α,7α-difluoromethylene-17α-acetoxypregn-4-en-20-one. |
| 3β-hydroxy-6,16α-dimethyl-17α-acetoxypregna-4,6-dien-20-one. | Methyl-i-butyl-phenethylfluorosilane. | 3β-(methyl-i-butyl-phenethylsilyloxy)-6,16α-dimethyl-17α-acetoxypregna-4,6-dien-20-one. |
| 3β-hydroxy-17α-ethynyl-17β-acetoxy-19-norandrost-4-ene. | Dimethylphenylfluorosilane. | 3β-(dimethylphenylsilyloxy)-17α-ethynyl-17β-acetoxy-19-norandrost-4-ene. |
| 3β-hydroxy-6-chloro-17α-acetoxypregna-4,6-dien-20-one. | Trimethylfluorosilane. | 3β-(trimethylsilyloxy)-6-chloro-17α-acetoxypregna-4,6-dien-20-one. |

Example 6

A solution of 0.17 g. of potassium hydroxide in 0.2 ml. of water and 2.5 ml. of methanol is added over 30 minutes to a refluxing solution of 1 g. of 3β-trimethylsilyloxy-6-chloro-17α-acetoxypregna-4, 6-dien-20-one in 30 ml. of methanol under nitrogen. The solution is refluxed for two hours, cooled, neutralized with acetic acid and concentrated under reduced pressure. After the addition of water, the solid which forms is collected by filtration and dried to yield 3β-trimethylsilyloxy-6-chloro-17α-hydroxypregna-4, 6-dien-20-one which is recrystallized from acetone:hexane.

Be repeating the above reaction with the following starting materials, namely

3β-trimethylsilyloxy-6-chloro-17α-acetoxy-19-norpregna-4,6-dien-20-one;

3β-trimethylsilyloxy-17α-ethynyl-17β-acetoxy-18-methyl-19-norandrost-4-ene;

3β-trimethylsilyloxy-17α-ethynyl-17β-acetoxy-19-norandrost-4-ene;

3β-trimethylsilyloxy-17α-chloroethynyl-17β-acetoxy-19-norandrost-4-ene;

1α,2α-methylene-3β-(phenyldi-p-tolylsilyloxy)-6-chloro-17α-acetoxypregna-4,6-dien-20-one;

3β-(tricyclohexylsilyloxy)-16α-methyl-17α-acetoxypregn-4-en-20-one;

3β-triphenylsilyloxy-17α-ethynyl-17β-acetoxy-19-norandrost-4-ene; and

3β-(dimethyl-t-butylsilyloxy)-6-chloro-17α-acetoxypregna-4,6-dien-20-one; are converted to the final products, namely 3β-trimethylsilyloxy-6-chloro-17α-hydroxy-19-norpregna-4,6-dien-20-one;

3β-trimethylsilyloxy-17α-ethynyl-17β-hydroxy-18-methyl-19-norandrost-4-ene;

3β-trimethylsilyloxy-17α-ethynyl-17β-hydroxy-19-norandrost-4-ene;

3β-trimethylsilyloxy-17α-chloroethynyl-17β-hydroxy-19-norandrost-4-ene;

1α,2α-methylene-3β-(phenyldi-p-tolylsilyloxy)-6-chloro-17α-hydroxypregna-4,6-dien-20-one;

3β-(tricyclohexylsilyloxy)-16α-methyl-17α-hydroxypregn-4-en-20-one;

3β-triphenylsilyloxy-17α-ethynyl-17β-hydroxy-19-norandrost-4-ene; and

3β-(dimethyl-t-butylsilyloxy)-6-chloro-17α-hydroxypregna-4,6-dien-20-one, respectively.

What is claimed is:
1. A compound of the formulas:

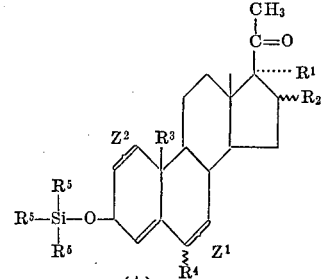

(A)

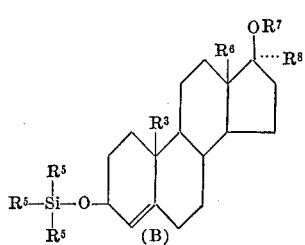

(B)

wherein $Z^1$ is a carbon-carbon single bond, a carbon-carbon double bond or a fused methylene group of the type

in which X is hydrogen, chloro or fluoro;
$Z^2$ is a carbon-carbon single bond or a fused methylene group of the type

in which X is hydrogen, chloro or fluoro;
$R^1$ is hydrogen, hydroxy or a hydrocarbon carboxylic acyloxy group;
$R^2$ is hydrogen, $\alpha$-methyl, $\beta$-methyl or methylene;
$R^1$ and $R^2$ together is the group

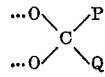

in which P is hydrogen, lower alkyl or aryl and Q is lower alkyl or aryl;
$R^3$ is hydrogen or methyl;
$R^4$ is hydrogen, methyl, trifluoromethyl, fluoro or chloro, the configuration of $R^4$ being alpha when $Z^1$ is a carbon-carbon single bond and the configuration of $R^4$ being beta when $Z^1$ is the group

in which X is hydrogen, chloro or fluoro;
each of $R^5$ independently is alkyl, aryl, alkaryl, aralkyl or cycloalkyl;
$R^6$ is hydrogen, methyl or ethyl;
$R^7$ is hydrogen, a hydrocarbon carboxylic acyl group, tetrahydropyran-2'-yl or tetrahydrofuran-2'-yl; and
$R^8$ is hydrogen, methyl, ethyl, vinyl, ethynyl, propynyl or chloroethynyl.

2. A compound according to Formula A of claim 1 wherein $Z^1$ is a carbon-carbon double bond and $Z^2$ is a carbon-carbon single bond.

3. A compound according to claim 2 wherein $R^1$ is acetoxy; $R^2$ is hydrogen; $R^3$ is methyl; $R^4$ is chloro and each of $R^5$ is methyl.

4. A compound according to claim 2 wherein $R^1$ is acetoxy; each of $R^2$ and $R^3$ is hydrogen; $R^4$ is chloro; and each of $R^5$ is methyl.

5. A compound according to claim 2 wherein $R^1$ is acetoxy; $R^2$ is hydrogen, $\alpha$-methyl or methylene; $R^3$ is hydrogen or methyl; $R^4$ is methyl; and each of $R^5$ is methyl.

6. A compound according to claim 2 wherein $R^1$ is acetoxy; $R^2$ is $\alpha$-methyl or methylene; $R^3$ is hydrogen or methyl; $R^4$ is chloro; and each of $R^5$ is methyl.

7. A compound according to claim 2 wherein $R^1$ is acetoxy; $R^2$ is hydrogen; $R^3$ is hydrogen or methyl; $R^4$ is chloro; and each of two of $R^5$ is methyl and the third $R^5$ is t-butyl.

8. A compound according to Formula A of claim 1 wherein $Z^1$ is a fused methylene group of the type

in which X is hydrogen, chloro or fluoro; and $Z^2$ is a carbon-carbon single bond.

9. A compound according to claim 8 wherein $R^1$ is acetoxy; $R^2$ is hydrogen; $R^3$ is methyl; $R^4$ is hydrogen, $\beta$-chloro or $\beta$-fluoro; each of $R^5$ is methyl; and X is fluoro.

10. A compound according to Formula A of claim 1 wherein $Z^1$ is a carbon-carbon double bond; $Z^2$ is a fused methylene group of the type

in which X is hydrogen, chloro or fluoro.

11. A compound according to claim 10 wherein $R^1$ is acetoxy; $R^2$ is hydrogen; $R^3$ is methyl; $R^4$ is chloro; each of $R^5$ is methyl; and X is hydrogen.

12. A compound according to claim 10 wherein $R^1$ is acetoxy; $R^2$ is hydrogen; $R^3$ is methyl; $R^4$ is chloro; each of two of $R^5$ is p-tolyl and the third $R^5$ is phenyl.

13. A compound according to Formula A of claim 1 wherein each of $Z^1$ and $Z^2$ is a carbon-carbon single bond.

14. A compound according to claim 13 wherein $R^1$ is acetoxy; $R^2$ is hydrogen; $R^3$ is methyl; $R^4$ is hydrogen, $\alpha$-chloro or $\alpha$-methyl; and each of $R^5$ is methyl.

15. A compound according to claim 13 wherein $R^1$ is acetoxy; $R^2$ is $\alpha$-methyl; $R^3$ is methyl; $R^4$ is hydrogen; and each of three of $R^5$ is methyl or cyclohexyl.

16. A compound according to claim 13 wherein $R^1$ is acetoxy; $R^2$ is methylene; $R^3$ is methyl; $R^4$ is hydrogen; and each of $R^5$ is methyl.

17. A compound according to claim 13 wherein $R^1$ is acetoxy; each of $R^2$, $R^3$ and $R^4$ is hydrogen; and each of $R^5$ is methyl.

18. A compound according to claim 13 wherein $R^1$ and $R^2$ together is the group

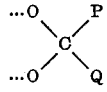

in which P is methyl and Q is phenyl; $R^3$ is methyl; $R^4$ is hydrogen; and each of three of $R^5$ is methyl or the first $R^5$ is methyl, the second $R^5$ is ethyl and the third $R^5$ is n-propyl.

19. A compound according to Formula B of claim 1 wherein each of $R^3$ and $R^6$ is hydrogen; each of three of $R^5$ is methyl or phenyl; $R^7$ is hydrogen, acetyl or tetrahydropyran-2'-yl; and $R^8$ is ethynyl.

20. A compound according to Formula B of claim 1 wherein $R^3$ is hydrogen; each of $R^5$ is methyl; each of $R^6$ and $R^7$ is hydrogen; and $R^8$ is chloroethynyl.

21. A compound according to Formula B of claim 1 wherein $R^3$ is hydrogen; each of $R^5$ is methyl; $R^6$ is methyl; $R^7$ is hydrogen; and $R^8$ is ethynyl.

22. A compound according to Formula B of claim 1 wherein $R^3$ is methyl; each of $R^5$ is methyl; each of $R^6$ and $R^7$ is hydrogen; and $R^8$ is ethynyl.

References Cited
UNITED STATES PATENTS 3,311,644  3/1967  Brown et al. _____ 260—397.4

OTHER REFERENCES

Hammond et al., Clin. Chim. Acta, 12 (1965) 363–364.

LEWIS GOTTS, *Primary Examiner.*

D. RIVERS, *Assistant Examiner.*